US011480314B2

(12) United States Patent
Perlin

(10) Patent No.: US 11,480,314 B2
(45) Date of Patent: Oct. 25, 2022

(54) LIGHT COLLIMATION ASSEMBLY AND LIGHT EMITTING DEVICES

(71) Applicant: Mark J. Perlin, Albany, CA (US)

(72) Inventor: Mark J. Perlin, Albany, CA (US)

( * ) Notice: Subject to any disclaimer, the term of this patent is extended or adjusted under 35 U.S.C. 154(b) by 0 days.

(21) Appl. No.: 17/173,409

(22) Filed: Feb. 11, 2021

(65) Prior Publication Data
US 2021/0247048 A1 Aug. 12, 2021

Related U.S. Application Data

(60) Provisional application No. 62/975,270, filed on Feb. 12, 2020.

(51) Int. Cl.
*F21V 7/08* (2006.01)
*F21V 7/06* (2006.01)
(Continued)

(52) U.S. Cl.
CPC .............. *F21V 7/08* (2013.01); *F21V 7/0025* (2013.01); *F21V 7/06* (2013.01); *G02B 27/30* (2013.01);
(Continued)

(58) Field of Classification Search
CPC . F21V 7/08; F21V 7/06; F21V 7/0025; F21V 7/0016; F21V 7/09; F21V 7/0008;
(Continued)

(56) References Cited

U.S. PATENT DOCUMENTS 2,690,503 A 9/1954 Garland
7,040,782 B2 * 5/2006 Mayer ................... F21V 7/0008
362/297

(Continued)

FOREIGN PATENT DOCUMENTS

CN 109578860 * 4/2019 .............. F21V 21/14
EP 2290703 A1 3/2011
(Continued)

OTHER PUBLICATIONS

CN 109578860, Apr. 5, 2019, Hou et al, English Translation (Year: 2019).*

*Primary Examiner* — Peggy A Neils
(74) *Attorney, Agent, or Firm* — Dicke, Billig & Czaja, PLLC

(57) ABSTRACT

Reflector assemblies and lighting devices incorporating such reflector assemblies are disclosed and described. The reflector assembly includes a reflector body defining an interior reflective surface that in some embodiments has a shape akin to a compound elliptic paraboloid. One or more LEDs can be maintained relative to the reflector body such that an entirety of a light cone emitted by the LED reflects from the interior reflective surface out to the world as a collimated beam. Lighting devices enable light rays to travel with a greater solid angle from LEDs than traditional in-plane optics. Light from a directional point source with a mounting position that is embedded in reflector body oriented to face an opposing curved mirror wall surface so light rays that are diverging prior to reflecting off the interior reflective surfaced are merged together after the reflective bounce to travel in parallel as a collimated beam.

18 Claims, 11 Drawing Sheets

(51) Int. Cl.
*G02B 27/30* (2006.01)
*F21V 7/00* (2006.01)
*F21Y 115/10* (2016.01)

(52) U.S. Cl.
CPC ......... *F21V 7/0016* (2013.01); *F21Y 2115/10* (2016.08)

(58) Field of Classification Search
CPC ..... F21V 21/14; G02B 27/30; F21Y 2115/10; F21S 41/147
See application file for complete search history.

(56) References Cited

U.S. PATENT DOCUMENTS

| | | | | |
|---|---|---|---|---|
| 7,249,870 | B1 * | 7/2007 | Shwisha | F21S 4/20 362/147 |
| 7,270,449 | B2 * | 9/2007 | Uke | F21V 7/09 362/297 |
| 7,527,390 | B2 | 5/2009 | Kakuta | |
| 7,758,204 | B2 | 7/2010 | Klipstein et al. | |
| 7,806,556 | B2 * | 10/2010 | Wu | F21V 29/74 362/235 |
| 10,317,043 | B2 * | 6/2019 | Madril | F21V 7/041 |
| 2009/0316384 | A1 * | 12/2009 | Kanayama | H01L 33/60 362/84 |
| 2012/0069562 | A1 | 3/2012 | Singer et al. | |
| 2015/0131260 | A1 * | 5/2015 | Van Delden | F21V 7/0008 362/241 |
| 2016/0084465 | A1 * | 3/2016 | Yamamoto | F21S 41/333 362/517 |
| 2016/0123560 | A1 * | 5/2016 | Catalano | F21V 14/04 362/217.06 |
| 2016/0245482 | A1 | 8/2016 | Shimoda | |
| 2017/0211775 | A1 * | 7/2017 | Potter | F21S 41/323 |
| 2019/0041028 | A1 | 2/2019 | Bremerich | |

FOREIGN PATENT DOCUMENTS

| | | | | |
|---|---|---|---|---|
| EP | 2631534 | * | 8/2013 | ................ F21S 8/10 |
| EP | 3336417 | * | 6/2018 | ................ F21V 7/00 |

* cited by examiner

LIGHT COLLIMATION ASSEMBLY AND LIGHT EMITTING DEVICES

CROSS REFERENCE TO RELATED APPLICATION

This Non-Provisional Patent Application claims the benefit of the filing date of U.S. Provisional Patent Application Ser. No. 62/975,270, filed Feb. 12, 2020, the entire teachings of which are incorporated herein by reference.

BACKGROUND

The present disclosure is directed to lighting devices. More particularly, it relates to assemblies and methods for collimating light from a light source (e.g., a plurality of LEDs, incandescent bulb, or other small light emitting source) as part of a light emitting device.

Light can be collimated to travel as parallel beams that spread minimally as they propagate. Various techniques are used to project collimate light. One technique for collimating light requires the use of a lens. A lamp, such as a light emitting diode (LED), can be shined directly through a lens to collimate the emitted light rays. Although a single lens can bend light from a single LED so that the light is collimated, multiple facets built into the lens are required to bend and collimate the light to achieve a high collimation efficiency and/or a device with multiple LEDs may need multiple collimating lenses. With other LED-based light device formats, one or more reflectors may be used to as part of a light collimation scheme. However, existing reflective mirror techniques, at least in the context of LEDs, generate undesirable beam spread and artifacts in illumination profiles. More specifically, light from each LED is inefficiently distributed, leading to divergence, spill, spatial distribution inconsistencies in illuminating target surfaces, etc.

Another concern associated with some LED lighting device formats relates to viewer safety. A viewer that looks directly at the LED source light may be harmed by its intensity. Diffusers can be used to prevent such hazards by softening the intensity of such light, but may result in reducing the collimation efficiency of the collimator and adds to overall costs.

LED-based lighting devices or luminaires (e.g., flash lights, headlights or headlamps, spot lights, task lights, etc.) are extremely efficient light sources for numerous end use applications. Any improvements to conventional techniques for collimating or distributing light from multiple LEDs in a single device will be well-received.

SUMMARY

The inventor of the present disclosure has recognized a need to address one or more of the above-mentioned problems.

DETAILED DESCRIPTION

Figure 1A:
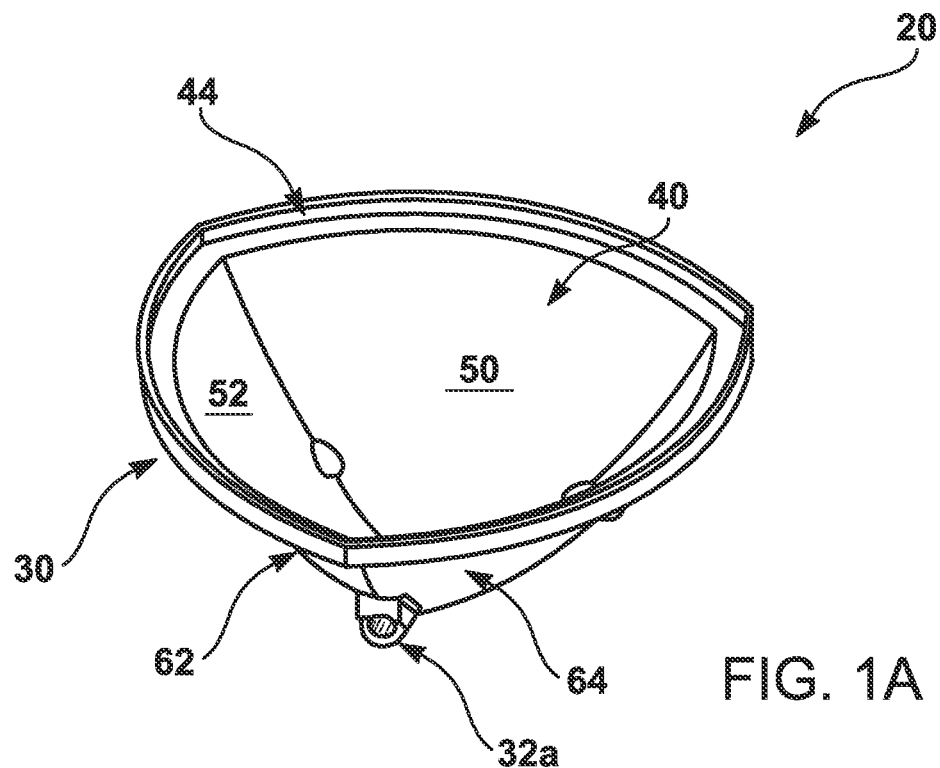
FIG. 1A is a top perspective view of a reflector assembly in accordance with principles of the present disclosure and useful with lighting devices of the present disclosure.
Figure 1B:
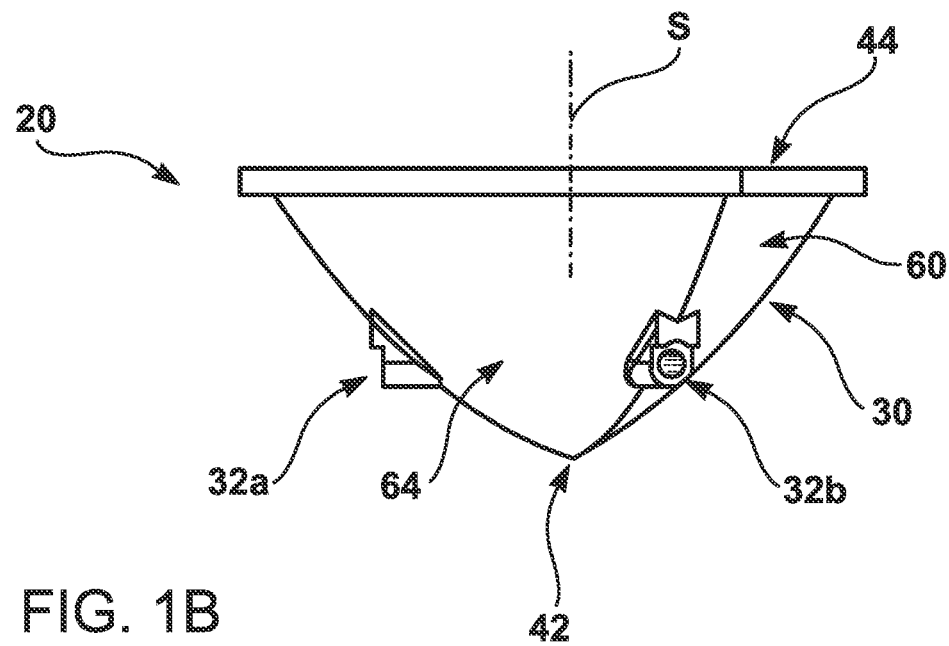
FIG. 1B is a side view of the reflector assembly of FIG. 1A.
Figure 1C:
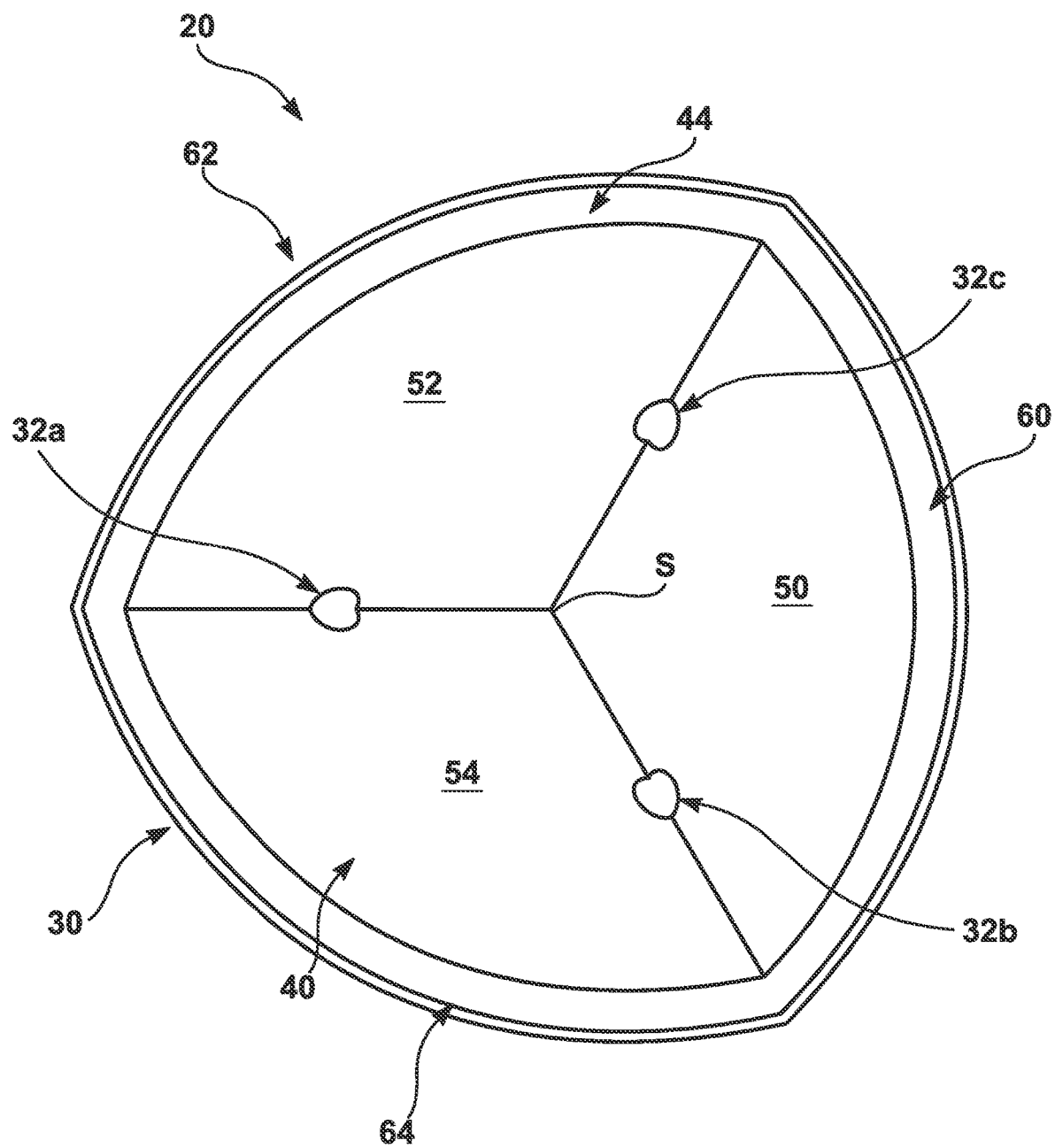
FIG. 1C is a top view of the reflector assembly of FIG. 1A.

Some aspects of the present disclosure are directed to LED-based lighting devices incorporating a light collimating reflector assembly. With this in mind, one example of a reflector assembly 20 in accordance with principles of the present disclosure is shown in FIGS. 1A-1C. As a point of reference, the reflector assembly 20 is configured for use with three LEDs (not shown) as part of an LED-based lighting device; in other embodiments, the reflector assemblies of the present disclosure can be configured for use with any other number of LEDs. The reflector assembly 20 includes a reflector body 30 and one or more LED port structures (identified in the views at 32a, 32b, and 32c). Details on the various components are provided below. In general terms, however, the port structures 32a-32c are each configured to retain and arrange an LED such that light from the LED is "aimed" at an interior surface of the reflector body 30 opposite the corresponding port structure 32a-32c. The reflector body 30, and in particular an interior surface thereof, is configured to reflect the so-received light from the corresponding LED, providing a collimating light beam that emits from the reflector assembly 20 with minimal divergence, and no spill. As a point of reference, such a collimated beam from multiple LEDs cannot be created with a single lens or reflector (conventional LED-based lighting device) because angular position, alignment imprecision between source and optic, occlusion of the aperture, shadows from source mounting, registration, etc., introduce divergence, non-homogeneity, and non-uniform travel from the light source.

The reflector body 30 has or defines a reflective interior surface (e.g., a mirror or mirror-like surface) identified generally at 40 in the views and configured to reflect visible light. In some non-limiting embodiments, a shape of at least the interior surface 40 defines a non-uniform elliptic paraboloid-like or compound elliptic paraboloid shape in extension from a base 42 to an upper rim 44. An axis of symmetry or central axis S of the overall shape of the interior reflective surface 40 is identified in the views, with a vertex existing at or near the base 42. The base 42 can be open or closed relative to an interior of the reflector body 30. The upper rim 44 is open to the interior of the reflector body 30, and serves as the light emitting side of the reflector assembly 20 as described below (i.e., the upper rim 44 defines an aperture through which light is emitted to the external environment).

With the non-limiting embodiment of FIGS. 1A-1C, the interior reflective surface 40 is collectively defined by first, second and third interior reflective surface segments 50, 52, 54. The interior reflective surface segments 50-54 can each be defined by an individual reflector body segment 60, 62, 64, respectively, that are separately formed or manufactured, and subsequently registered/assembled to one another (e.g., fused) to complete the reflector body 30. In other embodiments, the reflector body 30 is formed as a singular, homogenous and integral (or "unibody") construction; even with these alternative constructions, the corresponding interior surface 40 can still be viewed volumetrically as having the identifiable interior segments 50-54. Regardless, the first, second and third interior reflective surface segments 50-54 can be identical or substantially identical in size and shape, and are arranged to collectively generate the compound elliptic paraboloid shape or non-uniform elliptic paraboloid-like shape described above.

Figure 2A:
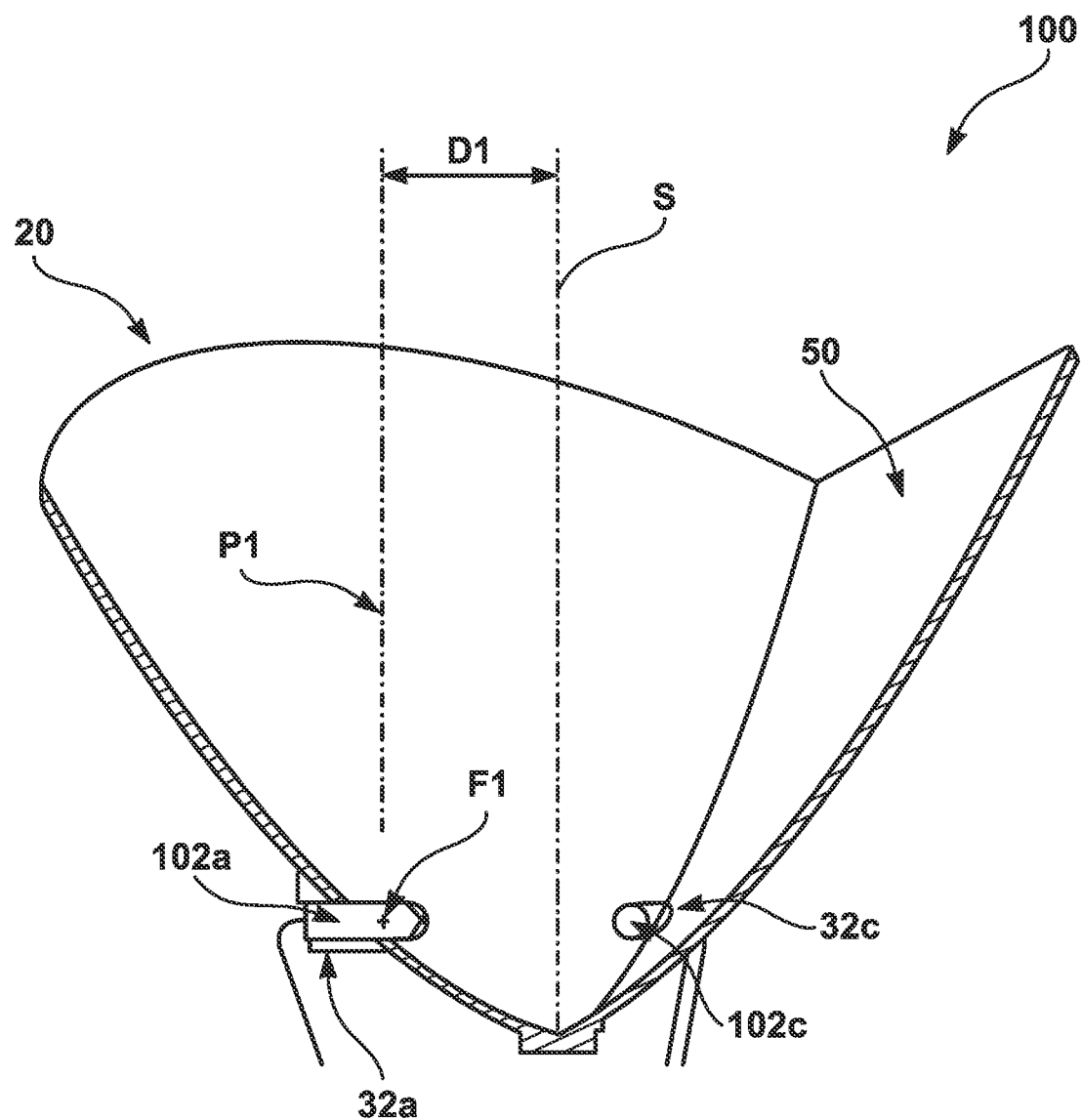
FIG. 2A is a cross-sectional view of a portions of a lighting device in accordance with principles of the present disclosure, including the reflector assembly of FIG. 1A and LEDs.

Each of the interior reflective surface segments 50-54 can define a portion of an elliptic paraboloid shape, with the axis about which the corresponding paraboloid shape revolves being off-set from the central axis S. These features are better understood with reference to FIG. 2A. As a point of reference, the view of FIG. 2A illustrates portions of a lighting device 100 in accordance with principles of the present disclosure that includes the reflector assembly 20 along with other components such as LEDs. As described above with respect to FIGS. 1A-1C, the reflector assembly 20 is configured to provide the three LED port structures 32a, 32b, 32c. Thus, the lighting device 100 of FIG. 2A will include three LEDs. In the cross-sectional representation of FIG. 2A, the first and third LED port structures 32a, 32c are visible; thus, only first and third LEDs 102a, 102c are shown in the view (it being understood that a LED will be mounted within the second LED port structure 32b (FIG. 1A)). With this in mind, in the view of FIG. 2A, an axis of symmetry or "paraboloid axis" P1 for the first interior reflective surface segment 50 (i.e., the axis about which the paraboloid shape of the first interior reflective surface segment 50 revolves) is identified, as is the central axis S. The paraboloid axis P1 can be parallel or substantially parallel (i.e., within 5 degrees of a truly parallel relationship) with the central axis S to generate a collimated light beam. In some embodiments, the paraboloid axis P1 is within 0.5 degrees or less of being parallel with the central axis S. Regardless, the paraboloid axis P1 is off-set from the central axis S by an off-set distance D1. The paraboloid shape of the first interior reflective surface segment 50 forms a focus F1 along the paraboloid axis P1. The first LED port structure 32a is configured and arranged relative to the first interior reflective surface segment 50 so as to locate the first LED 102a, and in particular the light-emitting face thereof, at, or in close proximity to, the focus F1.

Figure 2B:
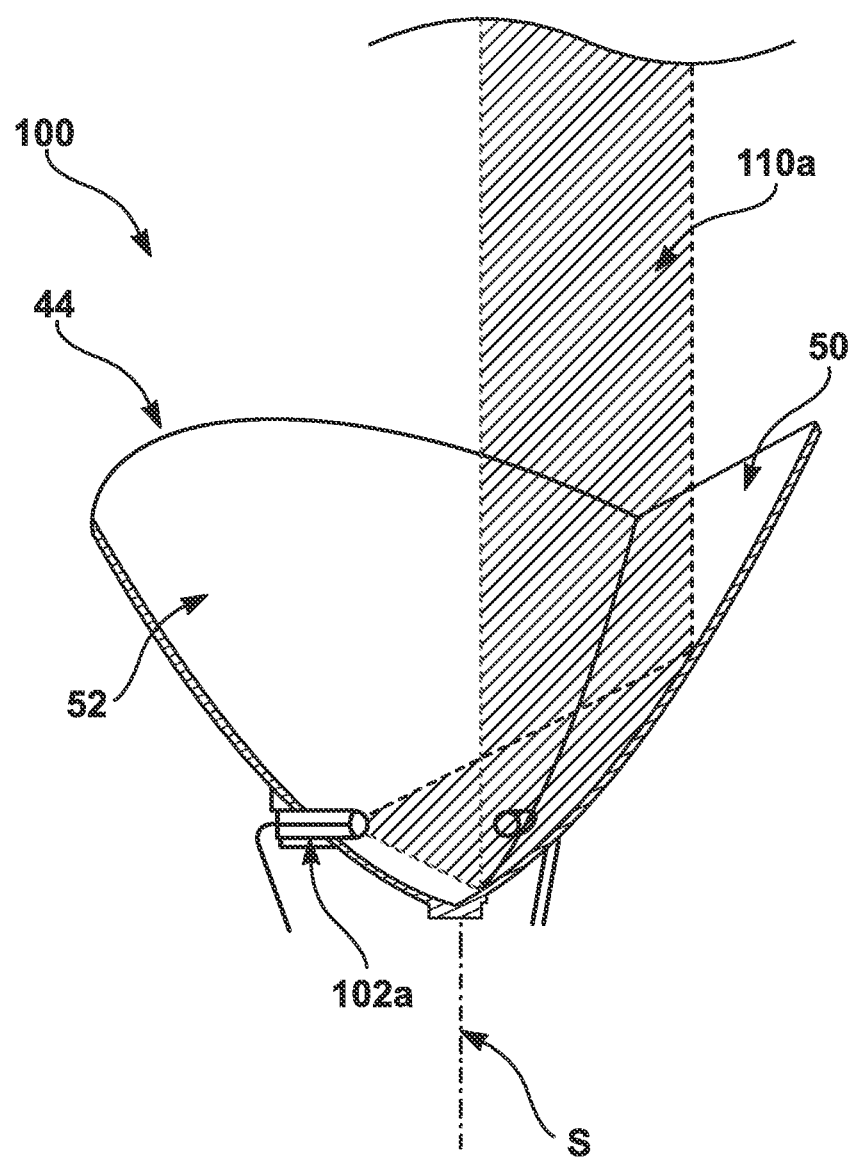
FIGS. 2B-2D illustrate light cones and light beams generated by the lighting device of FIG. 2A.
Figure 2C:
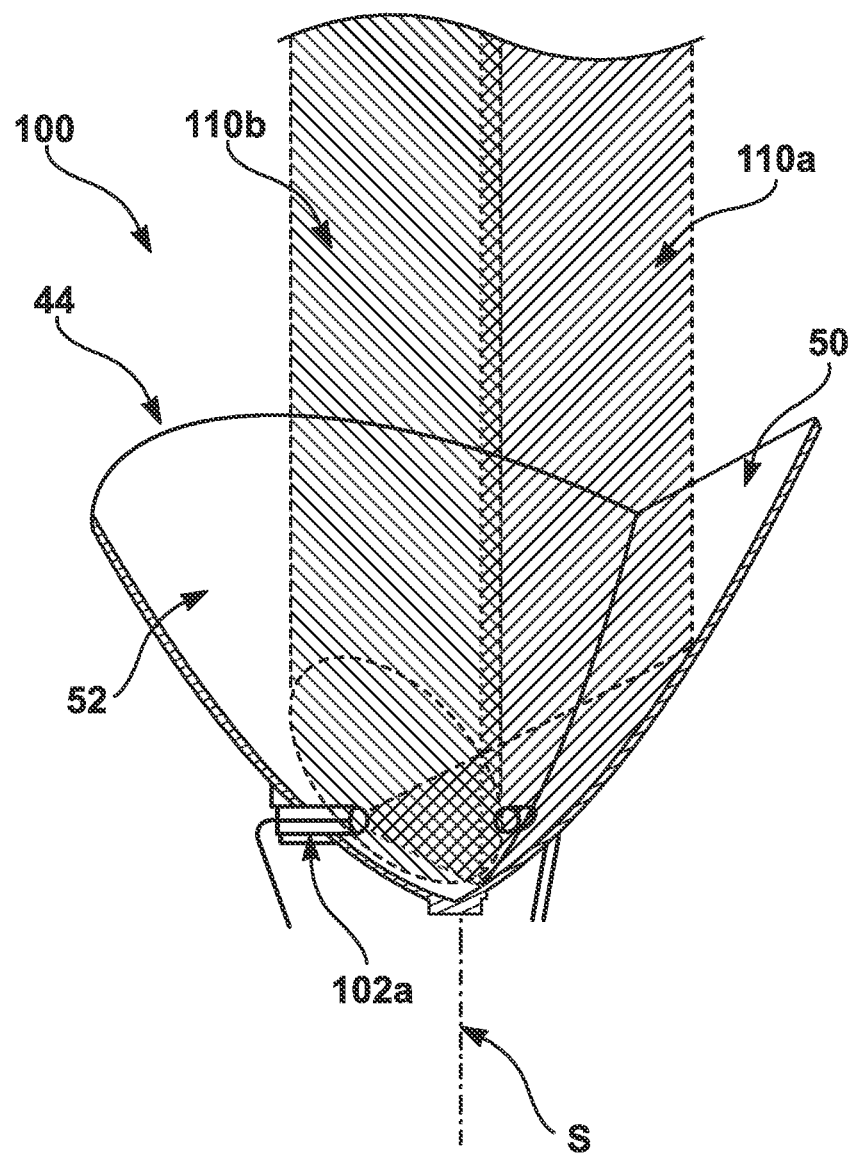
Figure 2D:
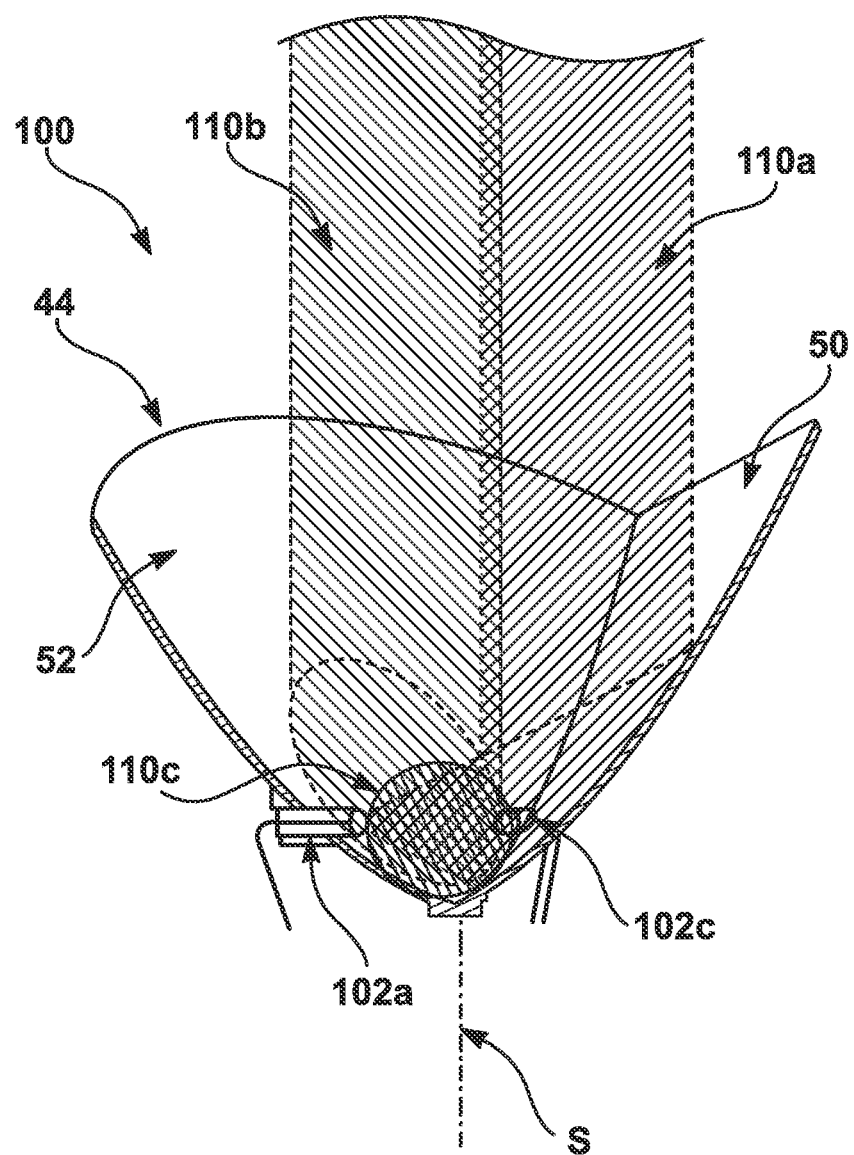

With this construction, and as shown in FIG. 2B, the first interior reflective surface segment 50 is opposite the first LED 102a relative to the central axis S; in other words, the light emitting face of the first LED 102a and the first interior reflective surface are at opposite sides of the central axis S, and the light cone as emitted by the first LED 102a crosses over the central axis S in traveling from the first LED 102a to the first interior reflective surface segment 50. Light from the first LED 102a is collimated after it has impinged upon and reflected off the first interior reflective surface segment 50 in a direction of the light emitting side 44, for example as a collimated beam 110a. The collimate beam 110a (or at least a centerline thereof) can be substantially parallel (i.e., within 5 degrees of a truly parallel relationship) with the central axis S in some embodiments. In some embodiments, the collimated beam 110a is within 0.5 degrees or less of being parallel with the central axis S. A shape of the first interior reflective surface segment 50 can be tailored to an expected light cone profile of the first LED 102a (or vice-versa) and/or location of the first LED 102a relative to the focus F1 (FIG. 2A) such that an entirety of the light cone (e.g., beam angle on the order of 50 degrees) from the first LED 102a impinges upon the first interior reflective surface segment 50. Moreover, the collimating effects of the first interior reflective surface segment 50 are achieved while at the same time locating the first LED 102a, and in particular the light emitting face thereof, out of a direct line of sight from an external or outside observer of the lighting device 100. Stated otherwise, the LED 102a is effectively recessed relative to the light emitting side/aperture (or upper rim) 44 such that when viewing the lighting device 100 from most, if not all, exterior angles or lines of sight, the light emitting side of the first LED 102a itself will not be directly visible (e.g., as described in greater detail below, outside approximately 45 degrees from the central axis, a straight line from the LEDs is clipped by the upper rim 44 of the reflector body so no glare into a viewer's eyeball). A similar relationship is established between the interior reflective surface 40 (FIG. 1C) and the other LEDs provided with the lighting device 100, with light from each of the remaining LEDs emitting from the lighting device 100 as collimated beams. For example, FIG. 2C illustrates a similar collimated beam 110b reflecting from the second interior reflective surface segment 52 (it being understood that light directed to the second interior reflective surface segment 52 is emitted from the LED (not shown) mounted within the second LED port structure 32b (FIG. 1C)). Finally, the view of FIG. 2D identifies generally at 110c light being emitted from the third LED 102c in a direction of the third interior reflected surface segment 54 (not visible in the cross-section of FIGS. 2B-2D but shown, for example, in the view of FIG. 1C). In some embodiments, then, the interior reflective surface 40 is configured to reflect inbound impinging collimate light into three receiving foci where light-travel paths intersect at or around the port structures.

Figure 3:
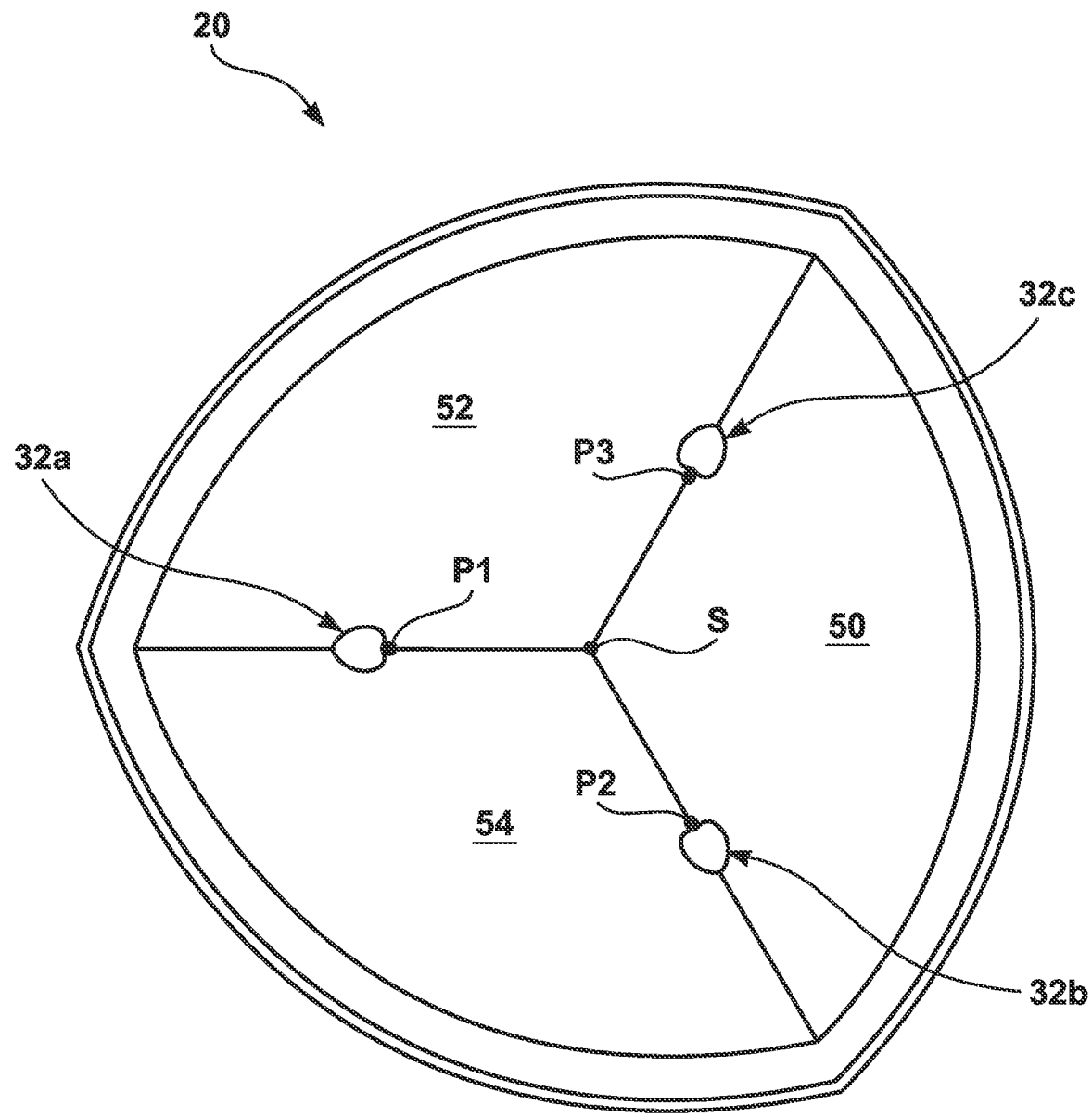
FIG. 3 is the top view of the reflector assembly of FIG. 1A and identifying additional features.

As identified in FIG. 3 (that is otherwise identical to the view of FIG. 1C), a relationship can be established by the second and third interior reflective surface segments 52, 54 relative to the central axis S that is highly similar to the descriptions above with respect to the first interior reflective surface segment 50. For example, an axis of symmetry or "paraboloid axis" P2 for the second interior reflective surface segment 52 (i.e., the axis about which the paraboloid shape of the second interior reflective surface segment 52 revolves) is identified, as is an axis of symmetry or "paraboloid axis" P3 for the third interior reflective surface segment 54 (i.e., the axis about which the paraboloid shape of the third interior reflective surface segment 54 revolves). The paraboloid axes P2, P3 can be parallel or substantially parallel (i.e., within 5 degrees of a truly parallel relationship) with the central axis S, and are off-set from the central axis S. In some embodiments, the paraboloid axes P2, P3 are within 0.5 degrees or less of being parallel with the central axis S. The paraboloid shape of the second interior reflective surface segment 52 forms a focus along the paraboloid axis P2; the second LED port structure 32b is configured and arranged relative to the second interior reflective surface segment 52 so as to locate the corresponding LED (not shown), and in particular the light-emitting face thereof, at, or in close proximity to, the focus along the paraboloid axis P2. Similarly, the paraboloid shape of the third interior reflective surface segment 54 forms a focus along the corresponding paraboloid axis P3; the third LED port structure 32c is configured and arranged relative to the third interior reflective surface segment 54 so as to locate the corresponding LED (not shown), and in particular the light-emitting face thereof, at, or in close proximity to, the focus along the paraboloid axis P3. When provided as part of a lighting device (e.g., the lighting device 100 of FIGS. 2A and 2B), collimated light beams are emitted from the three LEDs (e.g., akin to the representations of FIG. 2B). With additional reference to FIG. 2B, when viewed from a location in close proximity to the light emitting side 44 (e.g., a distance on the order of no more than 24 inches with lighting devices incorporating 3 LEDs having beam cone angles on the order of 50 degrees in some non-limiting embodiments), the three, so-generated light beams may appear as three distinct spots or beams. At further distances, inherent light divergence can become more prevalent, such that the emitted light profile appears as a single directional beam.

In some embodiments, the LED port structures 34a-34c can be configured to maintain the corresponding LED (or permit the corresponding LED to be moved to) slightly deeper laterally than at the focus of the corresponding interior reflective surface segment, a feature whereby the depth can be changed to change the degree of collimation. For example, in some optional embodiments, the lighting devices of the present disclosure can include a mechanism operable to control a location of the LED along the corresponding LED port structure. With these and related embodiments, light cone distribution from the LED can be controlled mechanically, with variable adjustment of the position of the LED light-emitting face relative to the corresponding interior reflective surface segment expanding or narrowing the resultant light beam emitted from the lighting device.

Commensurate with the descriptions above, in some embodiments, the LED is arranged relative to the corresponding interior reflective surface segment such that an entirety of the light cone propagating from the LED impinges upon the interior reflective surface segment. In other embodiments, the LED can be arranged such that only a portion of the emitted light cone impinges upon the corresponding interior reflective surface segment, whereas a remainder of the light cone "overshoots" the interior surface. With this arrangement, a wide diverging flood illumination in the foreground and a long distance collimated throw light are simultaneously projected from the lighting device.

Figure 4:
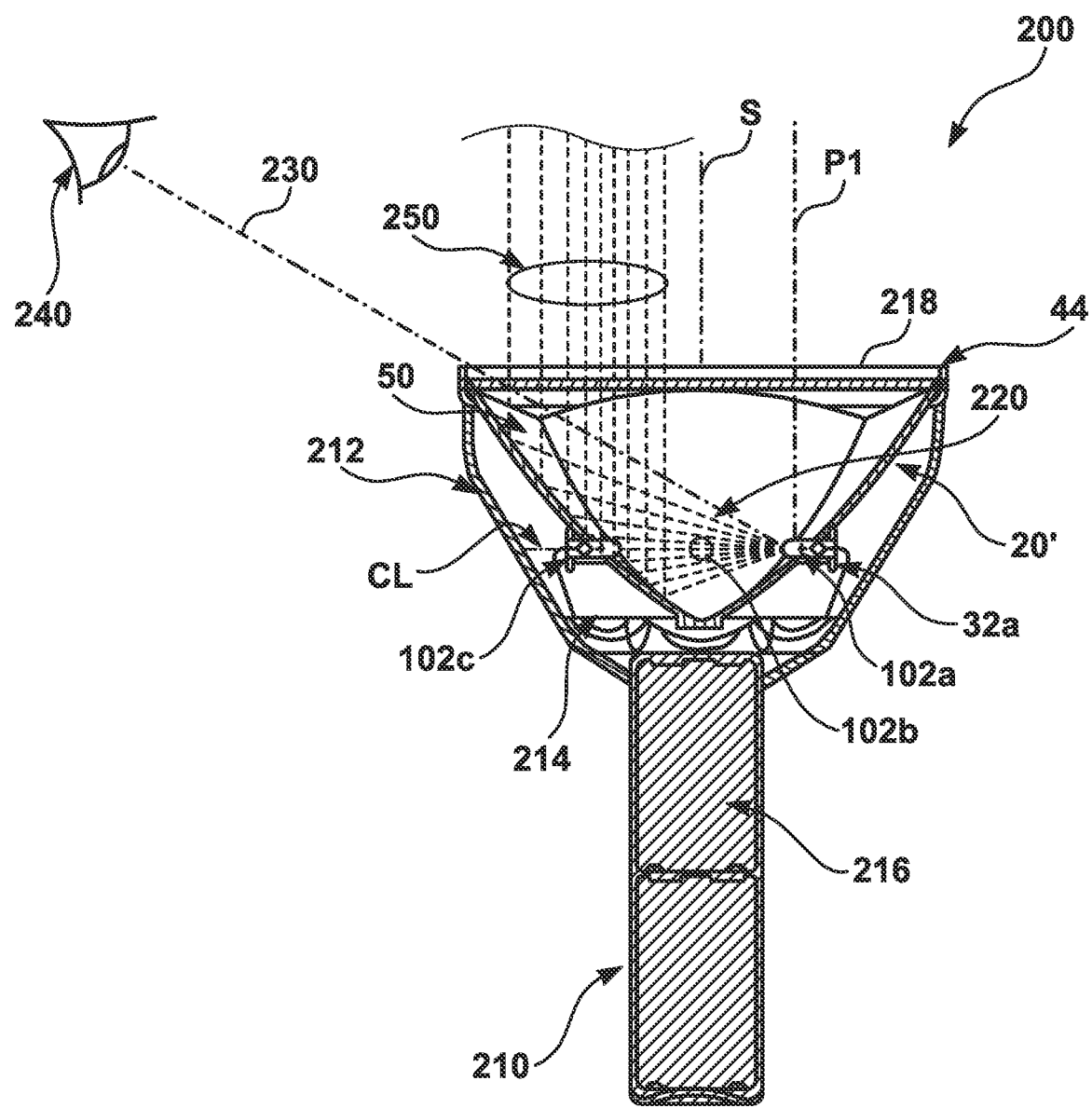
FIG. 4 is a cross-sectional view of another lighting device in accordance with principles of the present disclosure.

Another example of a lighting device 200 in accordance with principles of the present disclosure and incorporating a reflector assembly 20' is shown in FIG. 4. The reflector assembly 20' can be highly akin to the reflector assembly 20 as described above; with the non-limiting example of FIG. 4, the reflector assembly 20' includes a reflector body forming an interior reflective surface having four interior reflective surface segments (one of which is labeled at "50" in FIG. 4). With this non-limiting construction, the lighting device 200 can include a corresponding number (four) of the LEDs, for example the LEDs 102a, 102b, and 102c otherwise visible in the cross-sectional plane of FIG. 4. The lighting device 200 can be, or can be akin to, a flashlight, and includes various components such as a handle 210 supporting a housing 212. The reflector assembly 20' is maintained by the housing 212, and LEDs (e.g., LEDs 102a-102c) are mounted to the reflector assembly 20' as described above. A heat sink body 214 can be mounted adjacent the reflector assembly 20'. One or more batteries 216 are carried within the housing 212, and provide power to the LEDs via appropriate electrical connections. The lighting device 200 can include additional components conventionally employed with flashlights, for example a transparent or semi-transparent cover 218, circuitry, actuators (e.g., on-off switch), etc.

Regardless, FIG. 4 identifies the center axis S of the reflector body, and the paraboloid axis P1 of the first interior reflective surface segment 50. The first LED 102a is located at the focus of the first interior reflective surface segment 50. A light cone emitted from the first LED 102a is generally identified at 220, and is centered about a centerline CL. A geometry of the first LED 102a relative to the first interior reflective surface segment 50, a geometry of the first interior reflective surface segment 50 itself, and a beam angle of the light cone 220 can be collectively designed such that an entirety of the light cone 220 from the first LED 102a impinges upon the first interior reflective surface segment 50. With this construction, then, the light cone 220 is not within a direct line-of-sight 230 of a human eye 240 from the exterior of the lighting device 200 (e.g., the viewer's line-of-sight is effectively "clipped" by the upper rim of the reflector body at angles of 45 degrees or more from the center axis S, so that no glare directly from the LEDs reaches the viewer's eye 240). Optionally, light emanates from behind the interior reflective surface and is oriented at the opposite reflective surface. Moreover, in some embodiments the reflector assembly 20' is configured to permit repositioning of the LEDs relative to the corresponding LED port structure (e.g., the first LED 102a and the first LED port structure 32a), allowing the LEDs to be further recessed deeper and out of line-of-sight. It will be understood, however, that in some embodiments, the LEDs may only be recessed a relatively small distance before rays from the outer edge from the emitted light cone 220 bounce off the walls of the port structure perhaps leading to uncollimated stray rays. Regardless, the light cone 220 from the first LED 102a reflects from the first interior reflective surface segment 50 and is emitted from the lighting device 200 as a collimated beam 250 in accordance with the descriptions above. Recessing the first LED 102a has the effect of expanding the light cone 220. In other words, the optional variable LED positioning provided by some embodiments of the present disclosure can narrow or broaden the light cone as desired by the user; thus, some of the lighting devices of the present disclosure afford a user the ability to create broad "flood" lighting or narrow collimated, long "straight" lighting with a single lighting device; a wide diverging imprecise light can also be projected if desired. It will be understood that similar collimated beams are emitted for others of the LEDs included within the lighting device 200. At certain distances from the light emitting side 44, the collimated beams can appear as a single beam due, for example, to inherent divergent light rays. In some optional embodiments, one or more of the LEDs provided with the lighting device 200 can be swapped out for a different LED with a different light cone/beam angle.

Figure 5A:
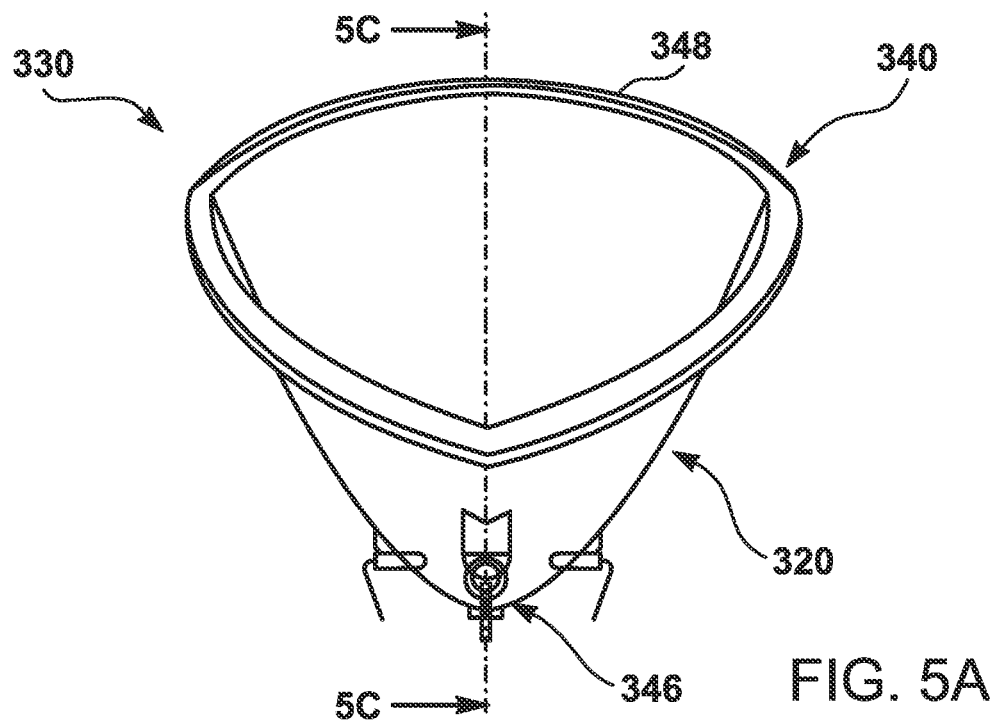
FIG. 5A is a top perspective view of portions of another lighting device in accordance with principles of the present disclosure.
Figure 5B:
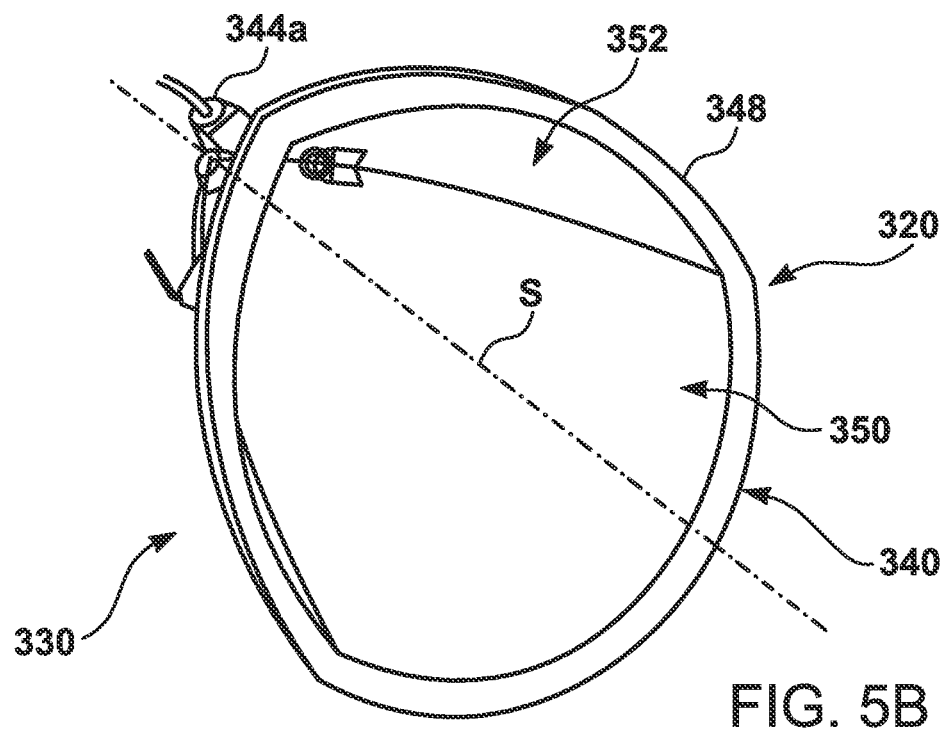
FIG. 5B is a side perspective view of the lighting device of FIG. 5A.
Figure 5C:
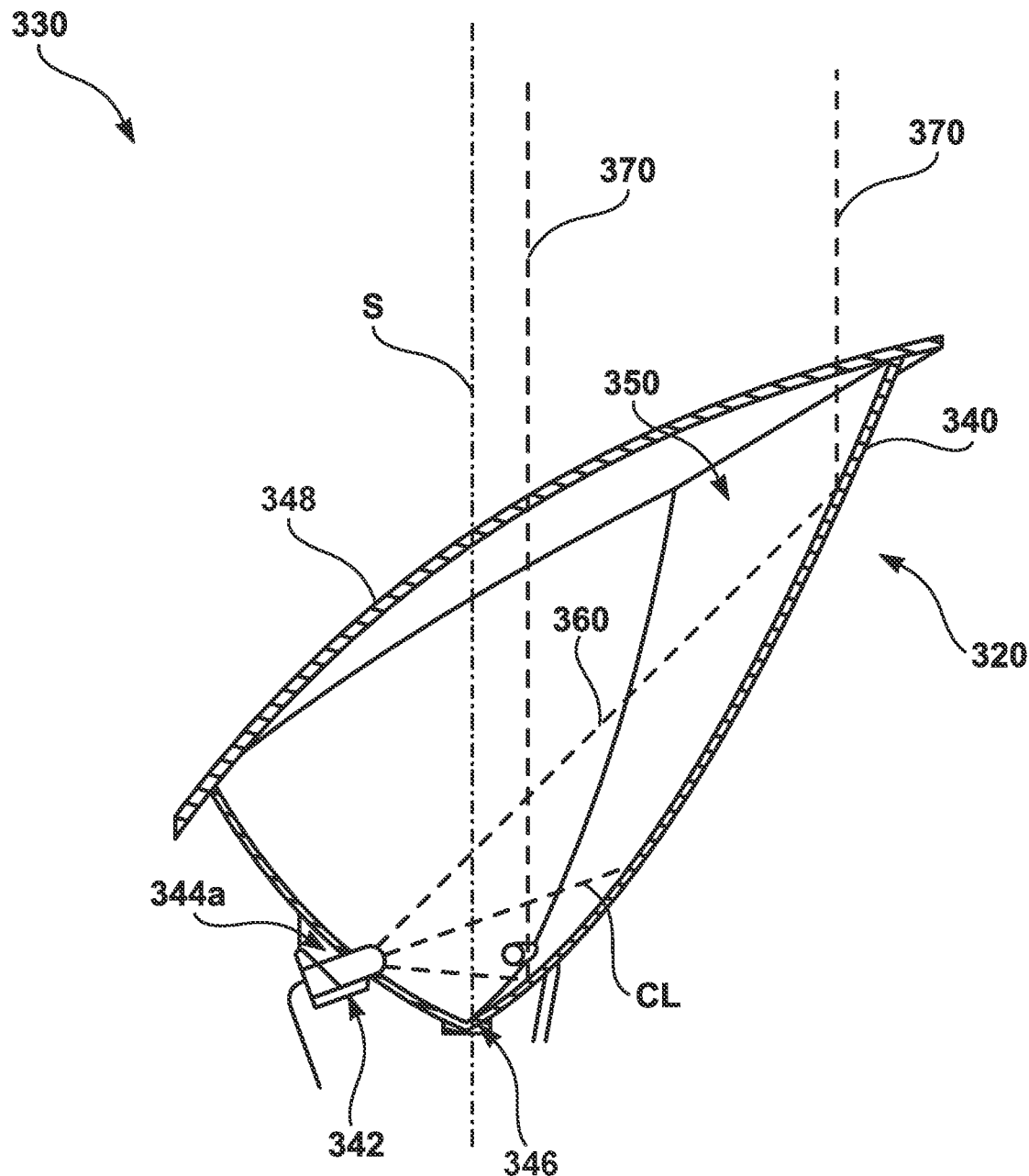
FIG. 5C is a cross-sectional view of the lighting device of FIG. 5A.

Another embodiment of a reflector assembly 320 in accordance with principles of the present disclosure is shown in FIGS. 5A-5C as part of a lighting device 330 (it being understood that only portions of the lighting device 330 are illustrated). The reflector assembly 320 is akin to the reflector assembly 20 (FIGS. 1A-1C) described above, and includes a reflector body 340 and three LED port structures (one of which is labeled at 342 in FIG. 5C). Each of the LEDs (a first one of which is labeled at 344*a*) provided with the lighting device 330 are mounted within corresponding one of the LED port structures 342 as described above.

The reflector body 340 can have a shape akin to a "scoop", and may be useful, for example, with an automobile headlight. An interior of the reflector body 340 can be formed or coated to be highly reflective to visible light, and can be viewed as generating a compound or non-uniform elliptic paraboloid shape about a central axis S in extension from a base 346 to an upper rim 348. With the scoop-like shape, a plane of the upper rim 348 is oblique or non-perpendicular to the central axis S. As with previous embodiments, the upper rim 348 serves as the light emitting side of the lighting device 330. The reflector body 340 can be configured for use with three LEDs, and thus can be viewed as having or defining three interior reflective surface segments extending between the base 346 and the upper rim 348. For example, a first interior reflective surface segment 350 is visible in FIG. 5B and is further labeled in FIG. 5C; a second interior reflective surface segment 352 is also visible and labeled in FIG. 5B. Each of the interior reflective surface segments defines a portion of an elliptic parabolic shape revolving around a paraboloid axis that is off-set from the central axis S as described above. As best shown in FIG. 5C, the LED port structure 342 maintains the first LED 344*a*, and in particular a light emitting face thereof, at, or proximate, the paraboloid axis of the first interior reflective surface segment 350, and such that a light cone 360 (that is otherwise about a centerline CL) emitted from the first LED 344*a* is aimed at the first interior reflective surface segment 350. A geometry of the first interior reflective surface segment 350 and a location and geometry of the first LED 344*a* relative to the first interior reflective surface segment 350 is such that an entirety of the light cone 360 impinges upon and reflects from the first interior reflective surface segment 350, exiting the lighting device 330 as a collimated beam 370. A similar relationship is established for remaining ones of the LEDs relative to the corresponding interior reflective surface segment. In some embodiments, the reflector assembly 320 can generate a broader spot size (as compared to other embodiments) due to the scoop-like reflective surface shape and/or due to the orientation of the LEDs being such that light cone(s) from the LEDs reach an entirety of the scooped circle shape.

Figure 6A:
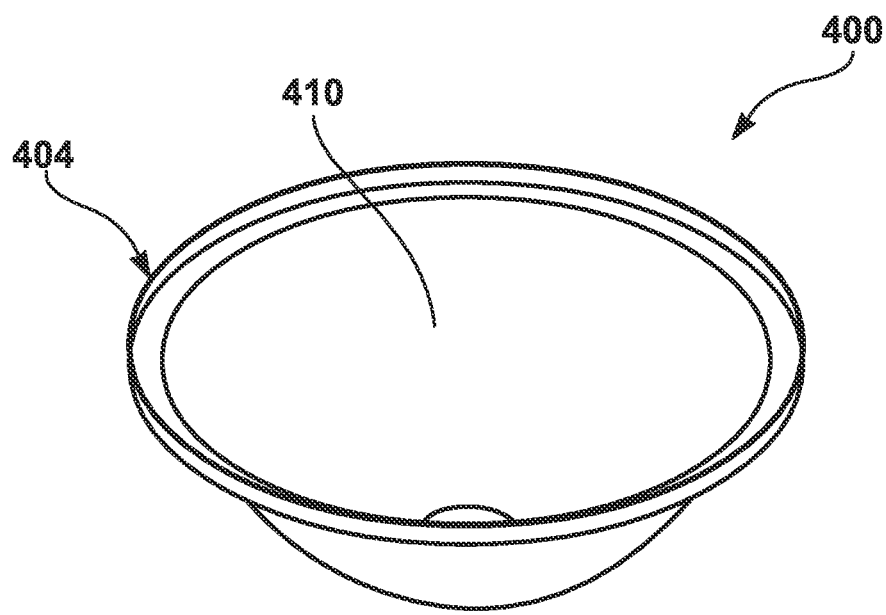
FIG. 6A is a top perspective view of another reflector assembly in accordance with principles of the present disclosure.
Figure 6B:
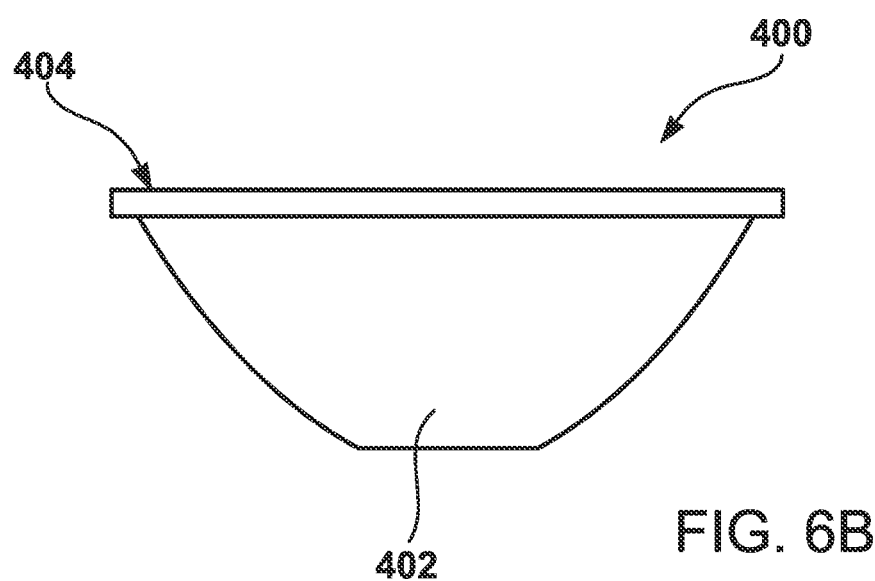
FIG. 6B is a side view of the reflector assembly of FIG. 6A.

While some embodiments of the present disclosure have described the reflector body as having a compound paraboloid interior shape, other configurations are also envisioned. For example, FIGS. 6A and 6B illustrate another reflector body 400 useful with the reflector assemblies and lighting devices of the present disclosure. The reflector body 400 defines a base 402 opposite an upper rim 404, and an interior reflective surface 410 that, in some embodiments can be a uniform or nearly uniform elliptic paraboloid. Although not shown, one or more LED port structures can be formed in or by the reflector body 400 for maintaining an LED (not shown) akin to the descriptions above. Due to the elliptic paraboloid shape, the interior reflective surface 410 has a single paraboloid axis or axis of symmetry, and does not have discernable segments. A location of each of the LEDs (via the corresponding LED port structure) may or may not position the light emitting face at the focus of the paraboloid shape. However, the light cone emitting from each of the LEDs will impinge upon, and reflect from, the interior reflective surface, exiting the reflector body 400 at the upper rim 404. The so-emitted directional distribution of light may or may not be considered uniformly collimated, but will exhibit a greater degree or level of collimation as compared to light cone as originally emitted from the LEDs.

With several of the embodiments described above, the lighting device includes a single reflector body (and corresponding LEDs mounted to or carried by the reflector body). In other embodiments, the lighting devices of the present disclosure can include two or more of the reflectors bodies (e.g., the reflector body 30 of FIG. 1A, the reflector body 400 of FIG. 6A, etc.) that are mounted or assembled to one another in a densely packed array. With these and related embodiments, the upper rims of the reflector bodies can be aligned or co-planar, with a selected perimeter shape (e.g., triangular versus circular) dictating how "closely" the reflector bodies can be packed relative to each other. With the lighting device constructions including a densely packed array of reflector bodies, the LEDs associated with each respective reflector body can be mounted in a manner facilitating a variable position of the LED relative to the corresponding interior reflective surface segment as described above. With these and related embodiments, the illumination profile emitted from the lighting device (e.g., emitted collectively from the plurality of reflector bodies) can be based on a desired beam spread (e.g., on the order of 2-10 degree beam spread) that in turn can be selected as a function of the end use application/distance from the illumination target (e.g., lighting for a stadium football field vs. lighting a photography shoot). By way of non-limiting example, where the lighting device is intended to illuminate a large target area (e.g., a stadium football field), an appropriate number of reflector bodies could be packed together and the resultant illumination profile (beam spread) could be tailored by adjusting the position of various ones LEDs relative to the corresponding reflector body so it broadens the emitted illumination area to correspond with the football field. A uniform "blanket" of light can be emitted from the so-constructed lighting device, for example if using an approximately 5 degree collimation angle (at a given distance between source and target surface). With these and related embodiments, parallel low divergence beams of neighboring/adjacent reflector bodies in the array merge to deliver a uniform/blended, homogenized emitted beam consistent with configuration of the array. Just as light from 3 LEDs in a reflector body from three non-uniform beam that merge (inward) to appear as a single fused illumination area (brighter in the middle) with some of the embodiments described above, this same "smoothing" can be achieved from an array of reflector bodies whereby the "smoothing" is a distribution of the near parallel beam both in an inward and outward direction. Collimated light from a plurality of purely collimated devices is made uniform, thus enabling the practical illumination of larger surface area targets.

The reflector assemblies and lighting devices of the present disclosure provide a marked improvement over previous designs. In some embodiments, the reflector assemblies and lighting devices of the present disclosure can prevent direct line-of-sight viewing of LEDs. Some embodiments discussed herein preclude LED eye hazards by eliminating line-of-sight paths from eye to emitter from within LED's "viewing angle". No part of the reflected beams from the lamps is visible to the eye of an observer—a particularly valuable feature for high-intensity LED lights whose bright point-source is an eye hazard. No aperture obstruction is necessary to have human eye-safe light. Additionally, some embodiments of the present disclosure can eliminate beam spread by providing a more continuous defined illumination profile than other reflective methods of collimated LED reflected beams. Embodiments discussed herein do not require or benefit from using a lens or diffuser optic. By merging parallel low divergence beams, artifacts (e.g., source shadowing, hotspots, etc.) are reduced, enabling both uniform spatial distribution at any distance and long range target illumination (due to low divergence). The beam divergence angle can be set by diffraction and source diameter divided by reflector focal length. Virtually all of the light emitted travels toward a target area. Spill light lost out of the collimated beam is minimized by matching the LED emission angle to the reflector f-number. The benefit of this geometry can include energy efficiency because directing virtually all of the light emitted toward a target area enables price competitiveness on a delivered lumen (1 m) per area basis. This efficiency enables the intended target to be illuminating using fewer individual emitting source as compared to conventional lighting designs, therefore conserving energy. No additional optical components (e.g., lenses, shrouds, shutters, shields, etc.) are required to control light rays. Simply by having a side port hole mounting position that recesses the light source (e.g., LED) behind the reflector body, a designer can take full advantage of the pleasing aesthetic of only the exiting light being visible to the observer, rather than the point source emission surface itself. In some embodiments, a height of the light source mounting position in the reflector body wall is just slightly below the middle midline portion of the reflector body, and optionally never above the middle to achieve purely collimated light. The light source can be oriented at 90 degrees relative to the optical axis of the corresponding interior reflective surface. Some embodiments provide enhanced collimation efficiency (i.e. control of light distribution) compared to what other collimation devices offer. Other optional benefits include: lower manufacturing costs from compact assemblies, decreased weight, optimized heat sink integration, less electricity consumption in operation, and shorter Z height/aspect ratio. Thus, some embodiments of the present disclosure provide a safer, cheaper, lighter, more efficient and more durable solution to collimating LED beams than refractive approaches, while avoiding prismatic artifacts. A wide variety of industries and end use applications may benefit from the lighting devices of the present disclosure, whether it be from one particular attribute or a combination of attributes (e.g., long distance, high uniformity, aesthetics, etc.). For example, longer distance illumination improves visibility and safety, whereas uniform spatial distribution improves industrial cure speed and process control quality.

Although the present disclosure has been described with reference to preferred embodiments, workers skilled in the art will recognize that changes can be made in form and detail without departing from the spirit and scope of the present disclosure. For example, in some optional embodiments, two or more different types of LEDs can be provided with a lighting device of the present disclosure, with the light emitted from such devices having a mixed-type format (e.g., differently colored LEDs can be utilized, with the lighting device optionally configured to "tune" or adjust the mix of those colors to generate a desired aesthetic look; in a technical lighting device, utilize LEDs of different wavelengths to, for example, bring out defects in inspection; etc.). In yet other embodiments, the lighting devices of the present disclosure can utilize a light source format other than an LED (e.g., incandescent bulb or other small light source). In yet other embodiments, the reflector bodies and reflector assemblies of the present disclosure can be utilized as part of an imaging device. For example, the lighting devices of the present disclosure (e.g., including the reflector assembly 20 and/or the reflector body 50 of FIGS. 1A-1C) can be employed as part of an imaging or image-capture device in which the receiving end of one or more image capturing or "camera" modules (e.g., CCD, detector, etc.) or other light-responsive device is assembled thereto. For example, image capturing modules can be mounted to each of the three port structures 32a-32c (and thus at the three foci of the interior reflective surface 40), or an image capturing module can be mounted at the truncated center base position 42, etc. These and similar image capturing devices of the present disclosure can be useful for multiple different end-use applications including, but not limited to, camera devices embedding near collimated lighting in operation to achieve improved performance (e.g., image quality by illuminating the target uniformly, and from further away, etc.) in, for example, exposure flash, strobe, or continuous operation mode.

What is claimed is:
1. A lighting device comprising:
a reflector body defining a rim opposite a base, and an interior reflective surface, wherein a shape of the reflector body defines a center axis, and further wherein the interior reflective surface continuously tapers toward the center axis in extension from the rim to the base;
wherein a shape of the interior reflective surface defines a central axis, and further wherein the interior reflective surface defines a plurality of interior reflective surface segments, and even further wherein a shape of at least one of the interior reflective surface segments defines a portion of an elliptic paraboloid having a paraboloid axis that is off-set from the central axis;
at least one LED maintained along the reflector body between the rim and the base, and further maintained with respect to the reflector body such that an entirety of a light cone emitted from the LED directly impinges upon, and reflects from, the interior reflective surface.
2. The lighting device of claim 1, wherein the lighting devices is configured such that light reflected from the interior reflective surface is exteriorly projected outside of the lighting device.
3. The lighting device of claim 1, wherein the interior reflective surface defines a compound elliptic paraboloid shape.
4. The lighting device of claim 1, wherein the interior reflective surface defines a non-uniform, elliptic paraboloid-like shape.
5. The lighting device of claim 1, wherein a light emitting face of a first one of the LEDs is maintained at a focus of the at least one interior reflective surface segments.
6. The lighting device of claim 1, wherein the paraboloid axis is substantially parallel to the central axis.
7. The lighting device of claim 1, wherein interior reflective surface defines first, second and third interior reflective surface segments each defining a portion of an elliptic paraboloid having a paraboloid axis that is off-set from the central axis.
8. The lighting device of claim 7, wherein the first, second, and third interior reflective surface segments combine to form the interior reflective surface as a continuous surface.
9. The lighting device of claim 7, wherein the lighting device includes first, second, and third LEDs, and further wherein a light emitting face of the first LED is maintained at a focus of the first interior surface segment, a light emitting face of the second LED is maintained at a focus of the second interior surface segment, and a light emitting face of the third LED is maintained at a focus of the third interior surface segment.

10. The lighting device of claim 1, wherein reflector body is configured such that the light cone reflects away from the interior reflective surface as a collimated beam.

11. The lighting device of claim 1, wherein the reflector body defines a port hole for receiving the at least one LED, a location of the port hole relative to the interior reflective surface defining two distinct vectors at 90 degrees to each other.

12. The lighting device of claim 1, wherein the interior reflective surface is continuous, defining an equilateral triangle profile at an aperture of the reflector body.

13. The lighting device of claim 1, wherein the base is open.

14. The lighting device of claim 1, further comprising a port structure maintaining the at least one LED, wherein the port structure is configured to permit a change in a position of the at least one LED relative to the interior reflective surface to affect a change in diameter of a light beam emitted from the lighting device.

15. The lighting device of claim 1, further comprising a plurality of the reflector bodies assembled to one another in an array and a plurality of the LEDs, wherein at least one of the LEDs is associated with a corresponding one of the reflector bodies.

16. The lighting device of claim 15, wherein the lighting device is configured such that light emitted from neighboring ones of the reflector bodies merge to form a blended light beam emitting from the lighting device.

17. The lighting device of claim 1, wherein the reflector body defines an aperture opposite the base and through which light reflected from the interior reflective surface is emitted to the external environment, and further wherein a light emitting side of the at least one LED is not directly visible though the aperture along a line of sight of at least 45 degrees from the central axis.

18. The lighting device of claim 9, wherein the reflector body defines first, second and third port holes, and further wherein the first LED is maintained within the first port hole, the second LED is maintained within the second port hole, and the third LED is maintained within the third port hole.

* * * * *